April 22, 1930.  F. L. MORSE  1,755,887
POWER TRANSMISSION CHAIN
Filed Dec. 23, 1927
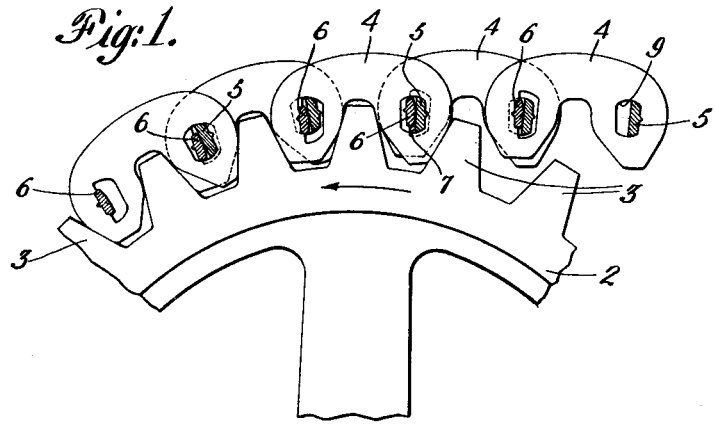
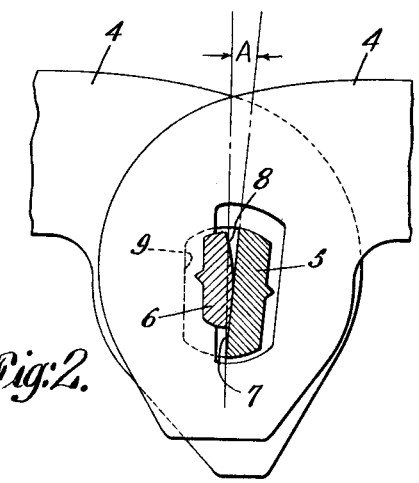
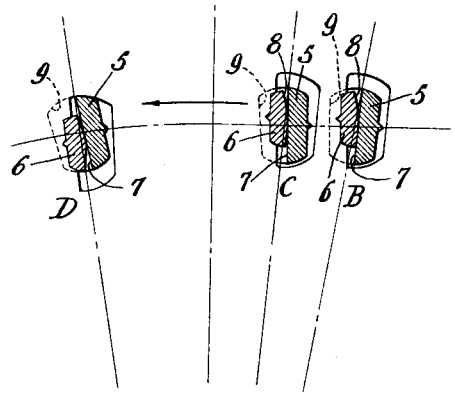
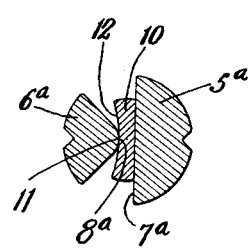
INVENTOR
Frank L. Morse
BY
Symmestvedt + Lechner
ATTORNEYS Patented Apr. 22, 1930

1,755,887

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

POWER-TRANSMISSION CHAIN

Application filed December 23, 1927. Serial No. 242,054.

This invention relates to power transmission chains of the so-called silent type, and is particularly concerned with the construction of the joints thereof. One of the objects is to combine rocking and sliding friction in the same joint; another object is to take advantage of certain characteristics of lubricated surfaces so far as the sliding friction is concerned; further objects are to reduce the noise and vibration of such chains at high speeds, to produce a simple and easily manufactured structure, and, in general, to improve the construction and operation of such chains.

In the accompanying drawings:

Fig. 1 is an elevation, partly in section, of a portion of a chain and sprocket illustrating the invention.

Fig. 2 is a detail of a typical joint drawn on a larger scale.

Fig. 3 shows three successive positions in the operation of the chain, and

Fig. 4 illustrates a modified form of joint.

Referring now to Fig. 1, the chain gear or sprocket 2 provided with the usual teeth 3 is engaged by a chain composed of successive sets of links 4, 4, 4, etc., which may be built up in the manner of ordinary silent chains to any desired length and width. In the drawings the end washers are removed and the joints connecting the links are shown in cross-section in order to more clearly show their construction.

Referring particularly to Figs. 1, 2 and 3, the joints have pintle members made in two parts 5 and 6, which extend transversely across the chain for substantially its entire width so as to form a broad bearing surface. The two parts 5 and 6 are keyed or otherwise secured to their respective set of links so that, in effect, they form a part of the links. There is no frictional movement or cutting between the pintle members and the link plates, that is, the link plates themselves are not used as bearing members. One of the pintle parts, as 5, has a substantially straight bearing face 7 which is inclined at a slight angle to the vertical as shown at A in Fig. 2. The other pintle part 6 has a curved or rocker bearing face 8 which may be wholly curved or partially straight, but in any case has sufficient curvature to permit the necessary articulation of the chain as it bends in going on and off the sprocket. Various forms of the rocking face may be used as is well known in the art in relation to rocker joints. This particular joint, however, is in its operation a sliding friction joint as well as a rocker joint.

When the chain is straight and under tension, the part 6 slides or is thrown to the upper part of the pintle holes 9 in the links 4 as shown in Figs. 1 and 2, owing principally to the slight tilt or angularity of the bearing face 7. When a chain link is picked up by a tooth 3 of the sprocket 2, the link is then compelled to take up a rotary motion around the center of the sprocket 2. The bearing face 7 of the pintle part 5 which is held in that link is then compelled to also rotate about the center of the sprocket 2, and its angularity relative to the straight part of the chain accordingly changes as the sprocket rotates. This is shown diagrammatically in Fig. 3, in which B, C, and D represent three successive positions. In the first position B the link has just been picked up by the sprocket tooth and the bearing face 7 is slanting slightly backwards and the pintle part 6 is in its upper position. In the next position C the face 7 has swung to a substantially vertical position, and the part 6 has rocked on its bearing face to permit the bend of the chain, but has not yet begun to slide. In the position D the face 7 has tilted forward beyond the angle of friction, and the part 6 under tension from the chain has slid on the face 7 downwardly toward the sprocket.

The joint is intended to operate under conditions of good lubrication, and under such conditions it will be particularly noted that there will be a wedge shaped film of oil between the bearing surface 7 and the bearing surface 8, the oil being thrown into the wedge by centrifugal force as the chain rotates, and that the pintle part slides in the manner of a thrust bearing shoe against this wedge of oil. The action of such a wedge shaped film is much more effective than a film between parallel surfaces, and thrust bearings supported on wedge shaped films can sustain considerably higher pressures than if rotated on parallel films.

In the drawings the amount of the sliding motion has been somewhat exaggerated, as in practice only a slight amount is necessary to ease the shock of engagement. After the slipping motion, as well as during it, the chain can continue to bend by rocking on the curved surface 8—the slipping motion preferably occurring early in the rotation of the joint, and the rocking motion principally in the latter portion of its action.

In the modification shown in Fig. 4 a wearing shoe 10 is interposed between the rocker face 8ᵃ and the straight face 7ᵃ for the purpose of minimizing wear as between the rocker surface of the pintle part 6ᵃ and the flat surface of the pintle part 5ᵃ. This shoe 10 provides a broad bearing surface for the sliding action, while still permitting rocking action at 11, as above described. The surface 12 of the shoe 10 is preferably curved as indicated, although, in some instances, a straight surface may be employed. In general, the operation of this joint is the same as that described in connection with the form illustrated in the other figures.

While I have in the foregoing described preferred forms of my invention, it will be understood that these are merely by way of illustration and that the invention is susceptible to various modifications and adaptations as will be apparent to those skilled in the art without departing from the scope of the invention as defined by the following claims.

I claim:—

1. In a power transmission chain, the combination of links, pintles connecting said links, said pintles each having a plurality of parts, one part of which is adapted to rock upon the other part and also to slide transversely upon the other part.

2. In a power transmission chain, the combination of links arranged in overlapping relation, pintles connecting said links, said pintles being composed of two or more parts, one of said pintle parts having a rocker face and another of said parts having an inclined sliding face, the rocker faces being adapted to slide transversely upon the sliding faces under the tension of the chain in certain positions of inclination of the faces and to rock on the sliding faces in other positions of inclination.

3. In a power transmission chain, the combination of successive links, pintles composed of two or more parts connecting said links, one of said parts being secured in one set of links and having a sliding bearing face inclined at an angle, another of said pintle parts being secured in the adjacent set of links and having a rocker bearing face, said last mentioned pintle part being adapted to slide as well as rock upon said sliding bearing face.

4. In a power transmission chain, the combination of successive sets of link plates arranged in overlapping relation, joints connecting said link plates, each joint having a seat pin secured to one set of link plates, said seat pin having a flat seating surface, and a rocker pin secured to the adjacent set of link plates, said rocker pin having a rocker surface, the link plates having holes of sufficient clearance to allow the rocker surface of the rocker pin to slide on the seating surface of the seat pin as well as rock thereon, the seat pin being inclined and the sliding of the rocker occurring under tension of the chain according to the direction of inclination of the seat pin.

5. A drive chain comprising in combination, a series of links composed of plates, a joint for pairs of said links comprising two pintle parts one having a flat bearing surface and the other having a surface adapted to rock on said flat surface, the part having the flat bearing surface being secured in one link in a position so that said surface is tilted in a line drawn at right angles to the line from a line of pull of the chain, and the other part being secured in the adjacent link, the link carrying the first mentioned pintle part having an aperture permitting the second pintle part to move downwardly on the first pintle part when the tilt of the first pintle part changes due to the bend of the first mentioned link with relation to the link adjacent thereto.

6. A drive chain comprising in combination, a series of links composed of plates, a joint for pairs of said links comprising a pintle part secured in one link in a position inclined from a perpendicular to the length of the link, said part having a bearing surface parallel the angle of inclination, and a pintle part secured in the adjacent link having a rocking bearing surface adapted to rock on the first mentioned bearing surface in the initial stages of articulation and to slide inwardly toward the center of articulation on said first mentioned bearing surface in subsequent stages of articulation.

7. A drive chain comprising in combination, a series of links composed of plates, a joint for pairs of said links comprising a pintle part secured in one link in a position inclined from a perpendicular to the length of the link, said part having a bearing surface parallel the angle of inclination, and a pintle part secured in the adjacent link adapted to rock with respect to the first mentioned pintle part in the initial stages of articulation and to slide inwardly toward the center of articulation in subsequent stages of articulation, together with wear resisting means between said pintle parts.

8. In a power transmission chain, the combination of links, pintles connecting said links, said pintles having a sliding face, a rocking face adapted to slide as well as rock relative to the sliding face, and an intermediate member interposed between the sliding and rocking faces, whereby the rocking face will be protected from wear due to its sliding motion.

9. In a power transmission chain, the combination of successive sets of link plates arranged in overlapping relation, joints connecting said link plates, each joint having a seat pin secured to one set of link plates and a rocker pin secured to the adjacent set of link plates, the link plates having holes of sufficient clearance to allow the rocker pin to slide transversely upon the seat pin as well as rock thereon, the conformation of the sliding parts being such that a substantially wedge shaped space is provided for lubricant during the sliding operation.

In testimony whereof I have hereunto signed my name.

FRANK L. MORSE.